Patented Jan. 21, 1947

2,414,740

UNITED STATES PATENT OFFICE 2,414,740

EMULSIFICATION OF OLEFINIC POLYMERS

Robert L. Holmes, Roselle, N. J., assignor, by mesne assignments, to Jasco, Incorporated, a corporation of Louisiana No Drawing. Application November 22, 1941, Serial No. 420,098

6 Claims. (Cl. 260—32)

This invention relates to emulsions, relates particularly to emulsions of synthetic polymers, and relates especially to emulsions of synthetic polymers containing a waxy or resinous type of material for modifying the tackiness of the polymer, both in emulsion form and after de-emulsification.

It has been found possible to prepare relatively high molecular weight polymers of isobutylene by a low temperature technique in which the isobutylene is cooled to liquefaction temperatures and polymerized by the application of active metal halide, Friedel-Crafts type catalysts to yield polymers having molecular weights ranging from 1,000 to 350,000 or even higher. These materials are of value for many commercial purposes, some of which require the material in aqueous emulsion form. To the present, however, great difficulty has been encountered in preparing satisfactory emulsions of polyisobutylene, or in fact, of olefinic polymers in general. This difficulty is in part due to the tough, rubbery character of the higher molecular weight materials, and to the very sticky character of all of the polymers, together with the residual cold flow which is characteristic of all of the polymers. The tack and cold flow are especially present in the lower molecular weight range i. e. below 150,000 molecular weight.

The present invention provides a new composition of matter in the form of an emulsion, and a new procedure for the emulsification of synthetic polymers such as isobutylenic polymers, by which a stable emulsion of very fine particle size is readily prepared, and simultaneously the stickiness of the polymer, both in the emulsion form and in the precipitated film form, is modified to yield a much more permanent emulsion, and to yield a film or coating precipitated from the emulsion which is waxy in character and much less sticky than the original polymer.

In practicing the invention a water insoluble, waxy type of polyester in the form of a polyhydroxy organic base esterified with a fatty acid having from 6 to 20 carbon atoms such as stearic or oleic or palmitic or ricinoleic acids with glycol or glycerine or other polyhydroxy compounds, either simple or substituted such as trihydroxy ethyl amine, is worked into the polymer by mechanical milling or kneading; and thereafter, water in successive small quantities is kneaded into the composition of polymer and ester until an emulsion of water in the polymer composition is obtained with the water as the disperse phase and the polymer compound as the continuous phase. The addition of water with kneading is continued until eventually a phase inversion occurs by which the water becomes the continuous phase and the polymer becomes the disperse phase, thereby yielding the desired emulsion, which may be diluted with additional water to bring the solid content to a suitable value.

Thus an object of the invention is to emulsify an olefinic polymer or a mixture of olefinic polymers. Another object of the invention is to modify the properties of an olefinic polymer during emulsification to make the emulsion more stable, and to make films prepared from the emulsion more waxy in character with a smoother, less sticky surface. Other objects and details of the invention will be apparent from the following description.

Polyisobutylene is preferably prepared from isobutylene of high purity which is conveniently obtainable from cracking gases resulting from the cracking of heavy petroleum oils to yield gasoline boiling range hydrocarbons. The purified isobutylene is preferably liquefied at higher than normal pressures with external cooling or at normal pressures and temperatures ranging from $-10°$ C. to $-100°$ C. or even lower by admixture therewith of such substances as liquid propane, liquid ethylene, liquid methane, as diluent-refrigerants, and if desired, the admixture of diluents such as the alkyl halides, liquid ethane, carbon disulfide and similar inert diluents. The desired low temperature may also be obtained by admixture with the isobutylene of solid carbon dioxide. Liquid ethylene is the preferred diluent-refrigerant, since it is conveniently obtainable, gives a temperature which is desirably low, the temperature usually ranging between $-95°$ C. and the boiling point of pure liquid ethylene at $-103°$ C. The cooled olefin mixture is then polymerized by the application thereto of an active halide Friedel-Crafts catalyst, such as gaseous boron trifluoride; or aluminum chloride dissolved in a convenient low freezing solvent such as ethyl or methyl chloride, carbon disulfide or other inert solvent which is liquid at the polymerization temperature. The reaction proceeds rapidly to yield the desired high molecular weight polymer, which may have a molecular weight from 1,000 up to 350,000 or to 500,000, depending upon the temperature, the purity of the isobutylene and the character of catalyst used.

The resulting polymer is a substantially saturated hydrocarbon, the iodine number being extremely low. The evidence seems to indicate that no matter how high the molecular weight, each single high molecular weight molecule is a monoolefin containing one double bond. Within the molecular weight range from 1,000 to about 6,000, the material is a heavy, sticky oil. Within the range from about 6,000 to about 27,000, the material is a sticky, plastic semi-solid. Above about 27,000, the polymer is a plastic, elastic solid of somewhat less stickiness than the lower molecular weight polymers.

The rubbery character of the polymer makes it exceedingly difficult to emulsify, since it is resistant to the colloid mill, and the sticky character makes it exceedingly difficult to prepare a non-tacky film on emulsification.

Example 1

In practicing the present invention, the polymer, preferably having a molecular weight above about 27,000 and especially a molecular weight of about 100,000, was compounded, according to the following formula:

| | |
|---|---|
| Polybutene _____parts__ | 700 |
| Diglycol stearate _____do____ | 100 |
| Water _____ | q. s. |

In preparing this emulsion, the polymer was placed in a kneader and the diglycol stearate was added slowly to the polymer during continuous working in the kneader; and the working was continued until a homogeneous mixture was obtained. The addition of water was then begun, and small quantities of water, were added slowly with continuous working until an emulsion was obtained with the water as the dispersed phase and the polymer as the continuous phase. The working was then continued with the addition of still further quantities of water until approximately 435 parts of water had been added, by which time a phase inversion had occurred to produce an aqueous emulsion in which the water was the continuous phase and the polymer the disperse phase. At this stage the emulsion contained approximately 60% of solid polymer. The emulsion was found to be stable and satisfactory at this concentration, and was also found to be readily diluted with additional quantities of water to substantially any desired percentage content of solid polymer without loss of stability of the emulsion.

Example 2

This emulsion was applied as a surface coating and the water allowed to evaporate. When the water was fully evaporated, the particles were found to have coalesced into a smooth, uniform, dry film with the characteristics of the original material with respect to its resistance to acid, acid solutions, oxygenated solvents and the like, and in addition, it was found to have a waxy surface substantially free from the tackiness characteristic of polybutene per se.

Example 3

The procedure is applicable to other low temperature olefinic polymers, such as the heteropolymers of isobutylene with butadiene, and a compound according to the following formula was found to be satisfactory.

| | |
|---|---|
| Isoolefinic-diolefinic polymer _____parts__ | 700 |
| Diglycol stearate _____do____ | 100 |
| Water _____ | q. s. |

Example 4

The heteropolymer mentioned in Example 3 is known to be reactive with sulfur in a curing reaction which profoundly modifies the characteristics of the polymer. In this instance, the emulsion was prepared according to the following formula:

| | Parts |
|---|---|
| Isobutylene-diolefin polymer _____ | 100 |
| Zinc oxide _____ | 5 |
| Stearic acid _____ | 3 |
| Sulfur _____ | 3 |
| Tuads (tetramethyl thiuram disulfide) _____ | 1 |
| Diglycol stearate _____ | 14 |

In preparing this composition, the polymer, together with the zinc oxide, stearic acid, sulfur and Tuads, were mixed together, preferably upon the open roll mill until a homogeneous composition was obtained. This mixture was then placed in the kneader and the diglycol stearate added in small portions and slowly to the compounded polymer, until the diglycol stearate was fully incorporated into the composition. Water was then added, as in Example 1, until a smooth emulsion was obtained.

Example 5

The emulsion as obtained in Example 4 was applied as a surface coating and the water allowed to evaporate. Upon curing by the application of heat at a temperature of approximately 155° C. for approximately 30 minutes, the material was found to be cured into a homogeneous, elastic, waxy surface film.

As above pointed out, the invention is not limited to emulsion compositions containing the diglycol stearate compound shown in Example 1. Alternatively, other analogous esters may be used. Particularly advantageous emulsifiers are diglycol oleate, propylene glyco oleate and glyceryl oleate.

Example 6

A composition of matter similar to that in Example 1 was prepared according to the following formula:

| | |
|---|---|
| Polybutene _____parts__ | 700 |
| Glyceryl oleate_____do____ | 100 |
| Water _____ | q. s. |

As in Example 1, the polymer was placed in the kneader and the oleate was added slowly to the polymer during continuous working until a thoroughly homogeneous mixture was obtained. At this step, the addition of water was begun, using relatively very small quantities of water, sufficiently small to avoid coating the kneader arms with water, and working in each portion of water before another portion was added. This procedure was continued until approximately 200 parts of water had been added. At this point, the mixture consisted of an emulsion in which the water was the disperse phase and the polybutene and oleate were the continuous phase. The addition of water was then continued and the phase inverted to yield an emulsion in which the water was the continuous phase and the polymer the disperse phase. This occurred at a concentration of about sixty percent solids.

This emulsion was applied as a surface coating and the water was allowed to evaporate as in Example 2. When the drying was complete, the emulsion particles were found to have coalesced into a smooth, uniform, dry, non-tacky film substantially the same as that in Example 2.

As above pointed out, the present invention is not limited to polybutenes alone but equally applicable to the isoolefin-diolefin interpolymers which are curable with sulfur and it is applicable also to the polybutadiene substance known as Buna rubber, to the polychloroprene known as neoprene, as well as to the various other plastic, elastic, sticky polymers having more or less rubber-like characteristics. The emulsified material of the invention also is not limited to diglycol stearate but includes any water-insoluble waxy polyester of a fatty acid. The fatty acid desirably has from 12 to 20 carbon atoms and is not necessarily either saturated or unsaturated chemically. Representative fatty acids are stearate, oleic, palmitic, tridecoic, ricinoleic, carnaubic and the like. They are preferably esterized with polyalcohols such as diglycol or glycerine or propylene glycol or butylene glycol or substituted glycols.

Thus the present invention consists essentially in the incorporation into the synthetic high molecular weight, elastic, rubber-like polymer of a substantial proportion of an ester of a glycol with a fatty acid having from 12 to 20 carbon atoms, together with sufficient water to produce an emulsion of the polymer which is of high stability and can be dried down into a non-tacky layer of the polymer.

While there are above disclosed but a limited number of embodiments of the invention, it is possible to produce still other embodiments without departing from the inventive concept herein disclosed, and it is, therefore, desired that only such limitations be imposed upon the appended claims as are stated therein or required by the prior art.

The invention claimed is:

1. A method of preparing an emulsion comprising the steps of combining a high molecular weight olefinic polymer with a glycolic ester of a fatty acid having from 12 to 20 carbon atoms, kneading the resultant mixture with successive small quantities of water until an emulsion is obtained in which the water is the disperse phase, and continuing the addition of water until a phase inversion is obtained to yield a watery emulsion of the polymer mixture.

2. A method of preparing an aqueous emulsion of an olefinic polymer comprising the steps in combination of combining a high molecular weight olefinic polymer with diglycol stearate, thereafter adding water in successive small portions with continuous working of the mixture until an emulsion of water in polymer-diglycol stearate mixture is obtained; then continuing the addition of water until a phase inversion occurs to produce an emulsion of polymer-diglycol stearate mixture in water.

3. A method of preparing an aqueous emulsion of an olefinic polymer comprising the steps in combination of combining a high molecular weight olefinic polymer with diglycol stearate, thereafter adding water in successive small portions with continuous working of the mixture until an emulsion of water in polymer-diglycol stearate mixture is obtained; then continuing the addition of water until a phase inversion occurs to produce an emulsion of polymer-diglycol stearate mixture in water, and thereafter diluting the emulsion with water to a desired percentage composition of solid polymer.

4. The method of preparing an emulsion of olefinic polymers comprising the steps in combination of kneading together a high molecular weight olefinic polymer having a molecular weight within the range between 27,000 and 500,000 and an ester of a fatty acid having from 12 to 20 carbon atoms with a poly alcohol having from 2 to 3 carbon atoms per molecule until a homogeneous mixture is obtained; then adding water in small quantities with continuous kneading of the mixture until an emulsion of water in polymer-ester mixture is obtained, then adding further successive small quantities of water with continuous kneading until a phase inversion occurs to yield an emulsion of polymer in water.

5. The method of preparing an emulsion of olefinic polymers comprising the steps in combination of kneading together a high molecular weight olefinic polymer having a molecular weight within the range between 27,000 and 500,000 and an ester of a fatty acid having from 12 to 20 carbon atoms with a poly alcohol having from 2 to 3 carbon atoms per molecule comprising diglycol oleate until a homogeneous mixture is obtained; then adding water in small quantities with continuous kneading of the mixture until an emulsion of water in polymer-ester mixture is obtained, then adding further successive small quantities of water with continuous kneading until a phase inversion occurs to yield an emulsion of polymer in water.

6. The method of preparing an emulsion of olefinic polymers comprising the steps in combination of kneading together a high molecular weight olefinic polymer having a molecular weight within the range between 27,000 and 500,000 and an ester of a fatty acid having from 12 to 20 carbon atoms with a poly alcohol having from 2 to 3 carbon atoms per molecule comprising glyceryl oleate until a homogeneous mixture is obtained; then adding water in small quantities with continuous kneading of the mixture until an emulsion of water in polymer-ester mixture is obtained, then adding further successive small quantities of water with continuous kneading until a phase inversion occurs to yield an emulsion of polymer in water.

ROBERT L. HOLMES.